United States Patent
Tang et al.

(10) Patent No.: US 10,291,483 B2
(45) Date of Patent: May 14, 2019

(54) ENTITY EMBEDDING-BASED ANOMALY DETECTION FOR HETEROGENEOUS CATEGORICAL EVENTS

(71) Applicant: NEC Laboratories America, Inc., Princeton, NJ (US)

(72) Inventors: LuAn Tang, Pennington, NJ (US); Zhengzhang Chen, Princeton Junction, NJ (US); Kai Zhang, Monmouth Junction, NJ (US); Haifeng Chen, West Windsor, NJ (US); Zhichun Li, Princeton, NJ (US)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 15/427,654

(22) Filed: Feb. 8, 2017

(65) Prior Publication Data
US 2017/0302516 A1    Oct. 19, 2017

Related U.S. Application Data

(60) Provisional application No. 62/324,402, filed on Apr. 19, 2016.

(51) Int. Cl.
*G06F 15/173* (2006.01)
*G06F 15/16* (2006.01)
*H04L 12/24* (2006.01)

(52) U.S. Cl.
CPC ........ *H04L 41/145* (2013.01); *H04L 41/0672* (2013.01); *H04L 41/0813* (2013.01)

(58) Field of Classification Search
CPC ............................ H04L 41/145; H04L 41/0813
USPC .................................................. 709/224, 221
See application file for complete search history.

(56) References Cited

U.S. PATENT DOCUMENTS

| | | | |
|---|---|---|---|
| 2014/0215618 A1* | 7/2014 | Striem Amit | G06F 21/55 726/23 |
| 2014/0283026 A1 | 9/2014 | Striem Amit | |
| 2015/0095003 A1* | 4/2015 | Horowitz | G05B 23/0254 703/6 |
| 2016/0142435 A1* | 5/2016 | Bernstein | H04L 63/1441 726/23 |
| 2017/0075749 A1* | 3/2017 | Ambichl | G06F 11/079 |
| 2018/0288079 A1* | 10/2018 | Muddu | G06N 99/005 |

* cited by examiner

*Primary Examiner* — Karen C Tang
(74) *Attorney, Agent, or Firm* — Joseph Kolodka

(57) ABSTRACT

A system and method are provided. The system includes a processor. The processor is configured to receive a plurality of events from network devices, the plurality of events including entities that are involved in the plurality of events. The processor is further configured to embed the entities into a common latent space based on co-occurrence of the entities in the plurality of events and model respective pairs of the entities for compatibility according to the embedding of the entities to form a pairwise interaction for the respective pairs of the entities. The processor is additionally configured to weigh the pairwise interaction of different ones of the respective pairs of the entities based on one or more compatibility criterion to generate a probability of an occurrence of an anomaly and alter the configuration of one or more of the network devices based on the probability of the occurrence of the anomaly.

20 Claims, 6 Drawing Sheets

600

Receive a plurality of events from network devices, the plurality of events including entities that are involved in the plurality of events.
610

Embed the entities into a common latent space based on co-occurrence of the entities in the plurality of events.
620

Model respective pairs of the entities for compatibility according to the embedding of the entities to form a pairwise interaction for the respective pairs of the entities.
630

Weigh the pairwise interaction of different ones of the respective pairs of the entities based on one or more compatibility criterion to generate a probability of an occurrence of an anomaly.
640

Alter the configuration of one or more of the network devices based on the probability of the occurrence of the anomaly.
650

FIG. 6

ENTITY EMBEDDING-BASED ANOMALY DETECTION FOR HETEROGENEOUS CATEGORICAL EVENTS

RELATED APPLICATION INFORMATION

This application claims priority to U.S. Provisional Patent Application Ser. No. 62/324,402 filed on Apr. 19, 2016, incorporated herein by reference in its entirety.

BACKGROUND

Technical Field

The present invention generally relates to anomaly detection and more particularly to anomaly detection for heterogeneous categorical events.

Description of the Related Art

A heterogeneous categorical event, $e=(a_1, \ldots, a_m)$, is a record that contains m different categorical attributes, and the i-th attribute value $a_i$ denotes an entity from the type $A_i$. For example, in the process interactions setting of a computer system, an event is a record involving entities of types such as source process, destination process, the user, time, etc.

Given a set of training events $D=\{e_1, \ldots, e_n\}$, by assuming that most events in D are normal, the problem is to learn a model M, so that when a new event $e_{n+1}$ comes, the model M can accurately predict whether the event is normal or abnormal.

There are many forms of anomaly detection. However, most of those forms focus on either a numerical data type or a supervised setting. As for methods focusing on unsupervised categorical anomaly detection, most of those methods try to model the regular patterns behind data, and produce an abnormal score of data according to some heuristics, such as the compression bits for an event.

SUMMARY

According to an aspect of the present principles, a method for anomaly detection in a network having network devices including computers. The method includes receiving a plurality of events from the network devices, the plurality of events including entities that are involved in the plurality of events. The method further includes embedding the entities into a common latent space based on co-occurrence of the entities in the plurality of events. The method also includes modeling respective pairs of the entities for compatibility according to the embedding of the entities to form a pairwise interaction for the respective pairs of the entities. The method additionally includes weighing the pairwise interaction of different ones of the respective pairs of the entities based on one or more compatibility criterion to generate a probability of an occurrence of an anomaly. The method also includes altering the configuration of one or more of the network devices based on the probability of the occurrence of the anomaly.

According to another aspect of the present principles, a system for performing anomaly detection in a network is provided. The system includes a server having a processor. The processor is configured to receive a plurality of events from network devices, the plurality of events including entities that are involved in the plurality of events. The processor is further configured to embed the entities into a common latent space based on co-occurrence of the entities in the plurality of events. The processor is additionally configured to model respective pairs of the entities for compatibility according to the embedding of the entities to form a pairwise interaction for the respective pairs of the entities. The processor is additionally configured to weigh the pairwise interaction of different ones of the respective pairs of the entities based on one or more compatibility criterion to generate a probability of an occurrence of an anomaly. The processor is also configured to alter the configuration of one or more of the network devices based on the probability of the occurrence of the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a flow diagram illustrating a method for network anomaly detection, in accordance with an embodiment of the present invention.

DETAILED DESCRIPTION OF PREFERRED EMBODIMENTS

An embodiment of the present invention is an embedding method, however, there are some fundamental differences between the embodiment of the present invention and other embedding methods. Firstly, many of those other embedding methods aim to embed pairwise interactions, but they only consider one type of entity. For pairwise interaction of different types of entities, an embodiment of the present invention provides a weighted scheme for distinguishing their importance. Secondly, existing embedding methods cannot be directly applied to predicting an abnormal score.

An embodiment of the present invention proposes a principled and unified probabilistic model for Anomaly detection via Probabilistic pairwise interaction and Entity embedding (APE), which directly models the likelihood of events. In this model, entities are embed into a common latent space using their observed co-occurrence in different events. More specifically, each pair of entities is first modeled for compatibility according to their embedding's. Then the weighted pairwise interactions of different entity types are utilized to define the event probability. Using Noise-Contrastive Estimation (NCE) with "context-dependent" noise distribution, the model can be learned efficiently regardless of the large event space.

Figure 1:
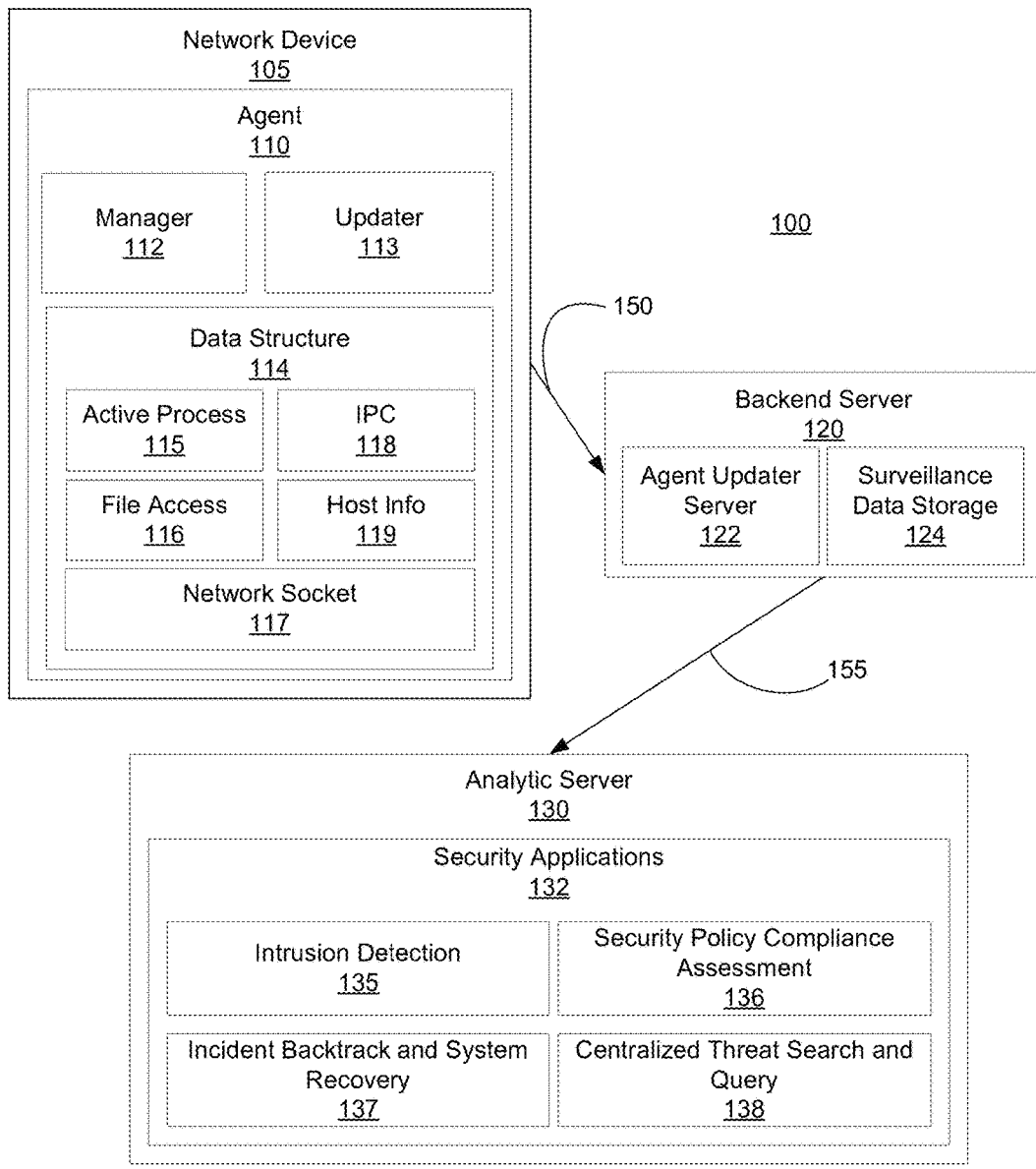
FIG. 1 is a block diagram illustrating an Automatic Security Intelligence (ASI) system, in accordance with an embodiment of the present invention.

Referring now in detail to the figures in which like numerals represent the same or similar elements and initially to FIG. 1, an Automatic Security Intelligence (ASI) system 100 is illustratively shown. It is to be appreciated that the elements 105, 120, and 130 shown in FIG. 1 can include other elements than those shown, as readily appreciated by one of ordinary skill in the art. For example, one or more processors, memory devices, network interfaces, and so forth can be included in one or more of elements 105, 120, and 130. In one embodiment, the ASI system may include three major components: (1) the agent 110 is installed in each host or network device 105 of the enterprise network to collect operational data; (2) the backend servers 112 receive the data from the agent 110, pre-process the data and send the data to the analysis server 114; (3) the analysis server 114 runs the security application programs to analyze the data. In one embodiment, the network device 105 may include an agent 110. In one embodiment, the agent 110 may include a manager 112. The manager 112 may handle the collected data. In another embodiment, the agent 110 may include an updater 113. The updater 113 may take the collected data and update other systems on the enterprise network with the collected data. In yet another embodiment, the agent 110 may include a data structure 114. The data structure 114 may include many different components. In one embodiment, the data structure 114 may include the active process information 115. The data structure 114 may also include inter-process communication (IPC) information 118, file access information 116, host information 119, and network socket information 117. In one embodiment, the agent 110 may send the collected data to a backend server 120 over an agent network 150.

The backend server 120 receives the collected data from the agent 110 over the agent network 150. In one embodiment, the backend server 120 may include an agent updater server 122. The agent updater server 122 communicates with the agent updater 113 over the agent network 150. In another embodiment, the backend server 120 may include surveillance data storage 124. The data surveillance storage 124 may store the collected data from the agent 110. The backend server 120 may process the collected data before sending the now pre-processed data to an analytic server 130 over the analytic network 155.

The analytic server 130 receives the pre-processed data from the backend server 120 over the analytic network 155. The analytic server 130 may include security applications 132. In one embodiment, the security applications 132 may include an intrusion detection system 135. The security applications 132 may also include a security policy compliance assessment system 136, an incident backtrack and system recovery application 137, and a centralized threat search and query system 138. The intrusion detection system 135 is a major application to detect any possible intrusions from sources inside or outside the enterprise network.

Figure 2:
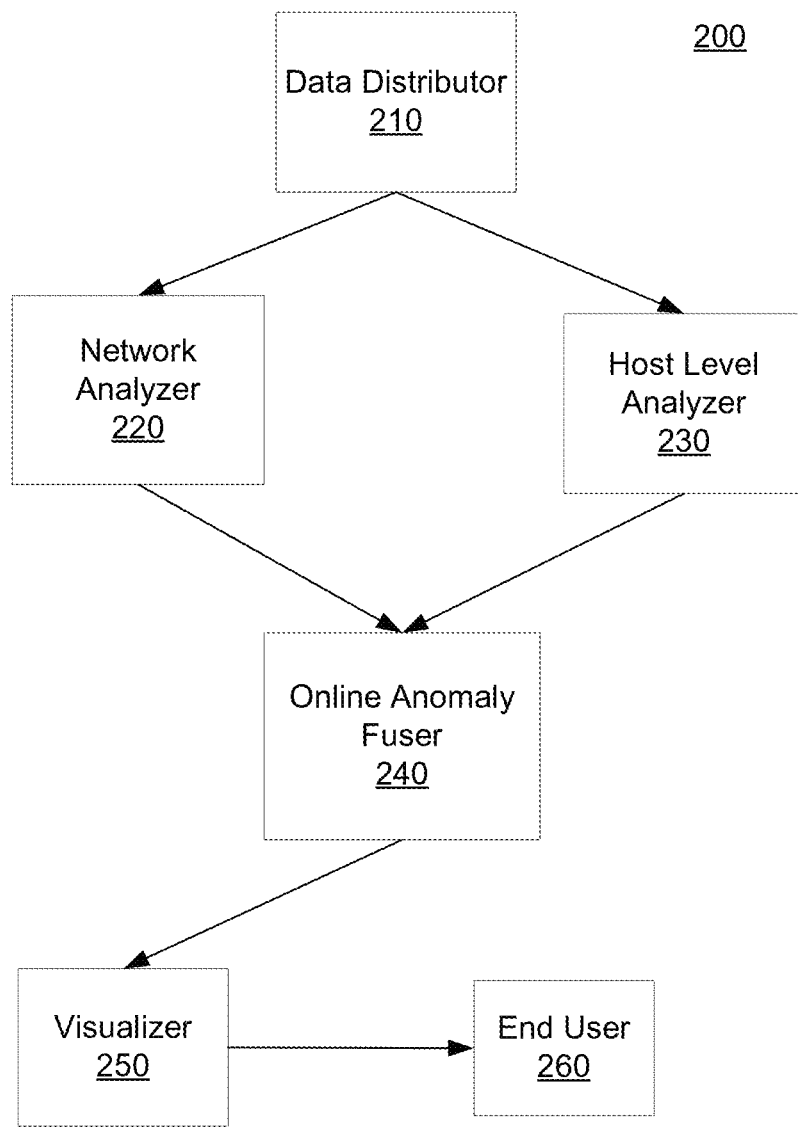
FIG. 2 is a block diagram illustrating an intrusion detection engine, in accordance with an embodiment of the present invention.

Referring now to FIG. 2, an intrusion detection engine 200 is illustratively shown. In one embodiment, the intrusion detection engine 200 may include five components in the engine: (1) the data distributor 210 may receive the data from a backend server and distribute the corresponding data to network or host level blocks; (2) the network analyzer 220 may process the network connection events (including TCP and UDP) and detect the abnormal connections; (3) the host level analyzer 230 may process the host level events, including user-to-process, process-to-file, user-to-registry, etc., for host level anomalies; (4) the anomaly fuser 240 may integrate the network and host level anomalies and refine the results for trustworthy intrusion events; and (5) the visualizer 250 may output the detection results to an end user 260.

An embodiment of the present invention models the event likelihood as it indicates how likely an event should happen according to the data. An event with unusual low likelihood is naturally abnormal. To achieve this, the embodiment of the present invention has to deal with the two main challenges: (1) the lack of intrinsic distance measured among entities and events, and (2) the exponentially large event space.

To overcome the lack of intrinsic distance measured among entities, the entities are embedded into a common latent space where their semantic can be preserved. To be more specific, each entity, such as a user, or a process in computer systems, is represented as a d-dimensional vector and will be automatically learned from the data. In the embedding space, the distance of entities can be naturally computed by distance/similarity measures in the space, such as Euclidean distances, vector dot product, and so on. Compared with other distance/similarity metrics defined on sets, such as the Jaccard similarity coefficient, the embedding method is more flexible and has nice properties such as transitivity.

To alleviate the large event space issue and enable efficient model learning, an embodiment of the present invention uses two strategies: (1) at the model level, instead of modeling all possible interactions among the entities, it only considers pairwise interaction that reflects the strength of co-occurrences of the entities; and (2) at the learning level, it uses noise-contrastive estimation with "context-dependent" noise distribution.

The pairwise interaction is intuitive/interpretable, efficient to compute, and less susceptible to over-fitting. Considering the following anomaly example that may be encountered in real scenarios:
(1) A maintenance program is usually triggered at midnight, but suddenly it is trigged during the day.
(2) A user usually connects to servers with low privileges, but suddenly the user tries to access some sever with high privileges.

In these scenarios, abnormal behaviors occur as a result of the unusual pairwise interaction among the entities (process and time in the first scenario, and user and machine in the second scenario). When abnormal behaviors are discovered, the system may isolate the computer causing the abnormal behavior by disabling the port in the switch the computer is using to connect to the network or powering the computer off. The system may also alert a system administrator with the abnormal behavior and computers/users causing the abnormal behavior, so the system administrator can investigate the abnormal behavior.

An embodiment of the present invention models the probability of a single event $e=\{a_1, \ldots, a_m\}$ in event space $\Omega$ using the following parametric form:

$$P_\theta(e) = \frac{\exp(S_\theta(e))}{\Sigma_{e' \in \Omega} \exp(S_\theta(e'))}, \quad (1)$$

where $\theta$ is the set of parameters, $S_\theta(e)$ is the scoring function for a given event e that quantifies its normality. The scoring function is instantiated by pairwise interactions among the embedded entities:

$$S_\theta(e) = \sum_{i,j: 1 \leq i < j \leq m} w_{ij}(v_{a_i} \cdot v_{a_j}), \quad (2)$$

where $w_{ij}$ is the weight for pairwise interaction between entity types $A_i$ and $A_j$, and it is non-negative constrained, i.e. for any i and j, $w_{ij} \geq 0$. $v_{a_i}$ is the embedding vector for entity $a_i$.

Figure 3:
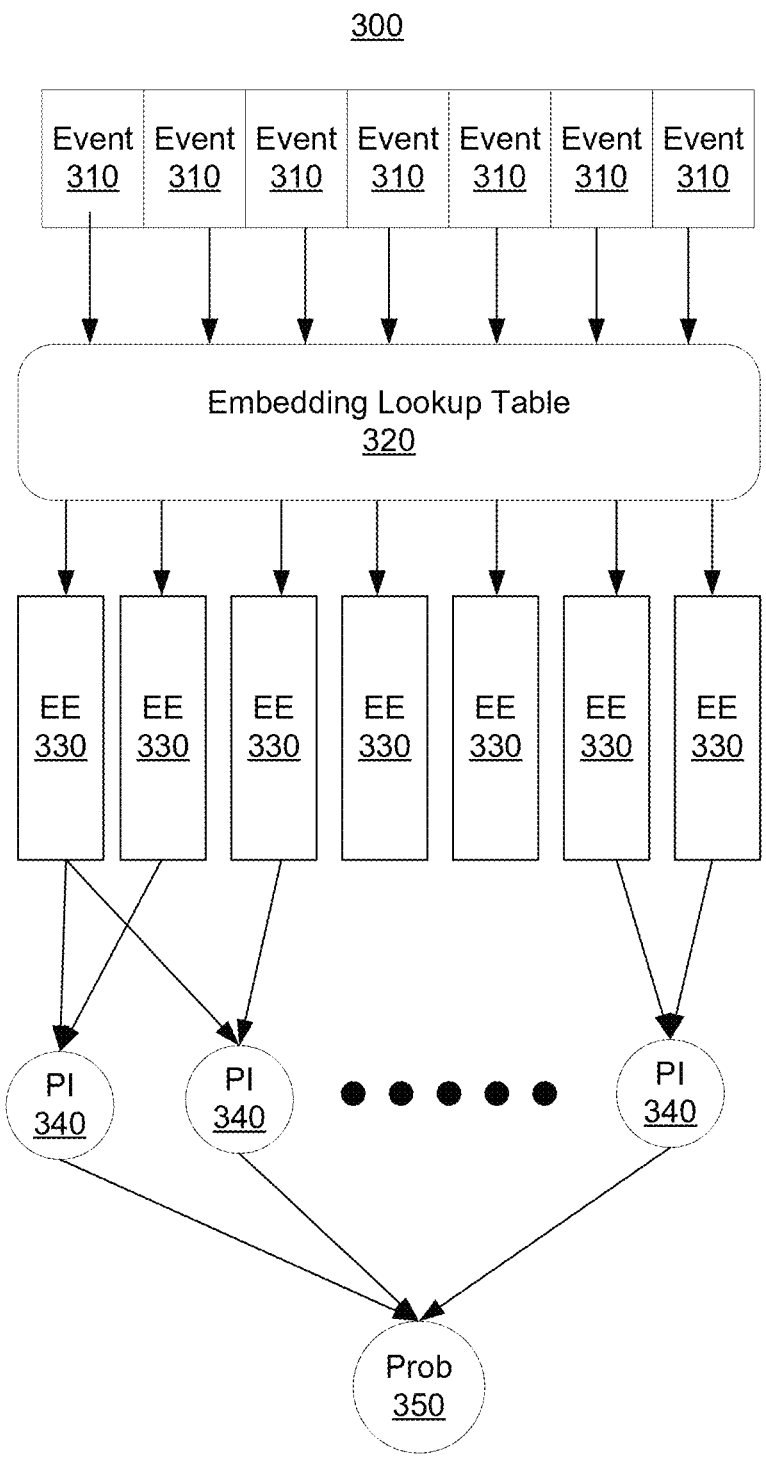
FIG. 3 is a block diagram illustrating a probabilistic pairwise interaction and entity embedding system, in accordance with an embodiment of the present invention.

Referring now to FIG. 3, a probabilistic pairwise interaction and entity embedding system 300 is illustratively shown. In one embodiment, the probabilistic pairwise interaction and entity embedding system 300 may include more than one event 310. The more than one event 310 may pass events into the embedding lookup table 320. The embedding lookup table 320 may make more than one entity embedding 330 based on the events. The more than one entity embedding 330 may combine into pairwise interactions 340. The pairwise interaction may form a probability 350.

To optimize the following maximum likelihood objective over events in the training data D:

$$\arg_\theta \max \sum_{e \in D} \log P_\theta(e), \qquad (3)$$

to solve the optimization problem, the major challenge is that the denominator in Eq. 1 sums over all possible event configurations, which is prohibitively large (O(exp m)). To address this challenging issue, Noise-Contrastive Estimation (NCE) is used.

NCE has been introduced for density estimation, and applied to estimate language model and word embedding. The basic idea of NCE is to reduce the problem of density estimation to binary classification, which is to discriminate samples from data distribution $P_d(e)$ and some artificial known noise distribution $P_n(e)$. In another word, the samples fed to the model can come from real training data set or from data being generated artificially, and the model is trained to classify them a posteriori.

Assuming noise/negative samples are k times more frequent than data samples, the posterior probability of an event e came from data distribution is $P(D=1|e,\theta)^2 = P_\theta(e)/(P_\theta(e) + kP_n(e))$. To fit the objective in Eq. 3, an embodiment of the present invention maximizes the expectation of log $P(D|e,\theta)$ under the mixture of data and noise/negative samples. This leads to the following new objective function:

$$J(\theta) = E_{e \sim P_d}\left[\log \frac{P_\theta(e)}{P_\theta(e) + kP_n(e)}\right] + kE_{e \sim P_n}\left[\log \frac{kP_n(e)}{P_\theta(e) + kP_n(e)}\right]. \qquad (4)$$

However, in this new objective function, the model distribution $P_\theta(e)$ is still too expensive to evaluate. NCE sidesteps this difficulty by avoiding explicit normalization and treating the normalization constant as a parameter. This leads to $P_\theta(e) = P_{\theta 0}(e)\exp(c)$, where $\theta = \{\theta^0, c\}$, and c is the original log-partition function as a single parameter, and is learned to normalize the whole distribution. Now the event probability function in Eq. 1 can be re-written as follows:

$$P_\theta(e) = \exp\left(\sum_{i,j: 1 \leq i < j \leq m} w_{ij}(v_{a_i} \cdot v_{a_j}) + c\right). \qquad (5)$$

To optimize the objective Eq. 4 given the training data D, an embodiment of the present invention replaces $P_d$ with $P\tilde{}_d$ (the empirical data distribution), and since the model is differentiable, stochastic gradient descent is used: for each observed training event e, first sample k noise/negative samples fe0g according to the known noise distribution $P_n$, and then update parameters according to the gradients of the following objective function (which is derived from Eq. 4 on given e; {e'} samples):

$$\log\sigma(\log P_\theta(e) - \log kP_n(e)) + \sum_{e'}\log\sigma(-\log P_\theta(e') + \log kP_n(e')), \qquad (6)$$

here $$\sigma(x) = \frac{1}{(1 + \exp(-x))}$$

is the sigmoid function.

The complexity of the algorithm is $O(Nkm^2d)$, where N is the number of total observed events it is trained on, k is number of negative examples drawn for each observed event, m is the number of entity types, and d is the embedding dimension. The complexity indicates that the model can be learned efficiently regardless of the O(exp m) large event space.

To apply NCE, as shown in Eq. 6, an embodiment of the present invention needs to draw negative samples from some known noise distribution $P_n$. Intuitively, the noise distribution should be close to the data distribution, otherwise the discriminating task would be too easy and the model cannot learn much structure from the data. Note that, different from previous work (such as language modeling or word embedding) that utilizes NCE, where each negative sample only involves one word/entity. Each event involves multiple entities of different types.

One straight-forward choice of noise distribution is "context-independent" noise distribution, where a negative event is drawn independently and does not depend on the observed event. One can sample a negative event according to some factorized distribution on event space, i.e., $$P_n^{factorized}(e) = p_{A_1}(a_1) \ldots p_{A_i}(a_i),$$

here $p_{A_i}(a_i)$ is the probability of choosing entity $a_i$ of the type $A_i$, which can be specified uniformly or computed by counting unigram in data. An embodiment of the present invention will use unigram as it is reported better.

Although the "context-independent" noise distribution is easy to evaluate. However, due to the large event space, this noise distribution would be very different from data distribution, which will lead to poor model learning.

Here an embodiment of the present invention uses a new "context-dependent" noise distribution where negative sampling is dependent on its context (i.e., the observed event). The procedure is, for each observed event e, an embodiment of the present invention first uniformly samples an entity type $A_i$, and then sample a new entity $a'_i \sim p_{A_i}(a'_i)$ to replace $a_i$ and form a new negative sample e'. As an embodiment of the present invention only modifies one entity in the observed event, the noise distribution will be close to data distribution, thus can lead to better model learning. However, by utilizing the new "context-dependent" noise generation, it becomes very hard to compute the exact noise probability $P_n(e)$. Therefore, an embodiment of the present invention uses an approximation instead as follows.

For a given observed "context" event e, an embodiment of the present invention defines the "context-dependent" noise distribution for sampled event e' as $P_n^c(e'|e)$. Since e' is sampled by randomly replacing one of the entity $a_i$ with $a'_i$ of the same $A_i$ type, the conditional probability $P_n^c(e'|e)=P_{A_i}(a'_i)/m$ (here an embodiment of the present invention assumes $A_i$ is chosen uniformly). Considering the large event space, it is unlikely that event e' is generated from observed events other than e, so an embodiment of the present invention can approximate the noise distribution with $P_n(e') \approx P_n^c(e'|e)P_A(e)$.

Furthermore, as $P_A(e)$ is usually small for most events, an embodiment of the present invention simply sets it to some constant 1, which leads to the final noise distribution term (which is used in Eq. 6):

$$\log kP_n(e') \approx \log P_{A_i}(a'_i)+z,$$

where $z=\log kl/m$ is a constant term. Although the value of z can vary, an embodiment of the present invention will let $z=0$ when plugging the approximated $\log kP_n(e_0)$ into Eq. 6. An embodiment of the present invention finds that ignoring z will only lead to a constant shift of learned parameter c. Since c is just the global normalization term, it will not affect the relative normal/abnormal scores of different events.

To compute $P_n(e)$ for an observed event e, since an embodiment of the present invention does not know which entity is replaced as in the negative event case, the embodiment of the present invention will use the expectation as follows:

$$\log kP_n(e) \approx \sum_i \frac{1}{m} \log P_{A_i}(a_i) + z,$$

and again the z will be ignored when plugging into Eq. 6.

There are some fundamental differences between this present invention and other embedding methods. Firstly, many of those embedding methods aim to embed pairwise interactions, but they only consider one type of entity. For pairwise interaction of different types of entities, an embodiment of the present invention provides a weighted scheme for distinguishing their importance. Secondly, existing embedding methods cannot be directly applied to predicting abnormal score. An embodiment of the present invention can generate the likelihood of an event, and the abnormal event are reported as the one with low likelihood.

Figure 4:
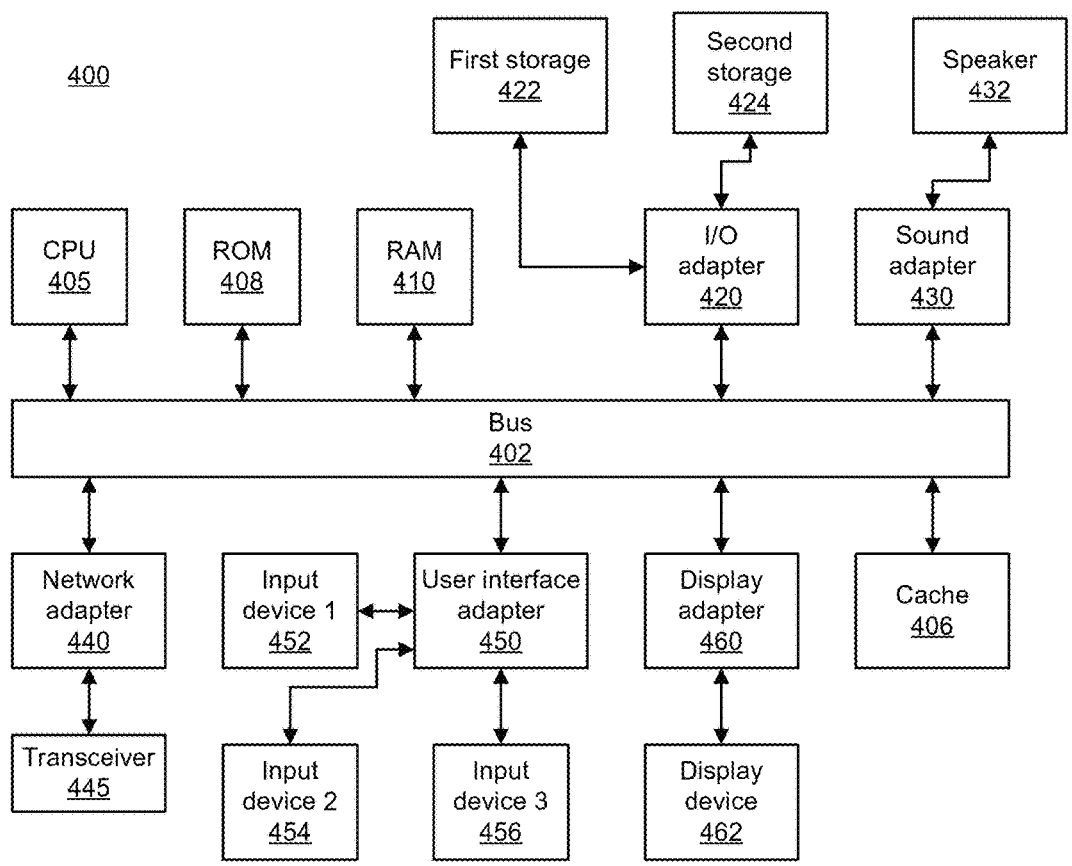
FIG. 4 is a block diagram illustrating a computer system, in accordance with an embodiment of the present invention.

Referring to FIG. 4, an exemplary computer system 400 is shown which may represent a server or a node, in accordance with an embodiment of the present invention. The computer system 400 includes at least one processor (CPU) 405 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 may be operatively coupled to system bus 402 by the sound adapter 430. A transceiver 445 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the computer system 400 may also include other elements (not shown), as readily contemplated by one of skill in the art, as well as omit certain elements. For example, various other input devices and/or output devices can be included in computer system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 400 are readily contemplated by one of ordinary skill in the art given the teachings of the present invention provided herein.

Figure 5:
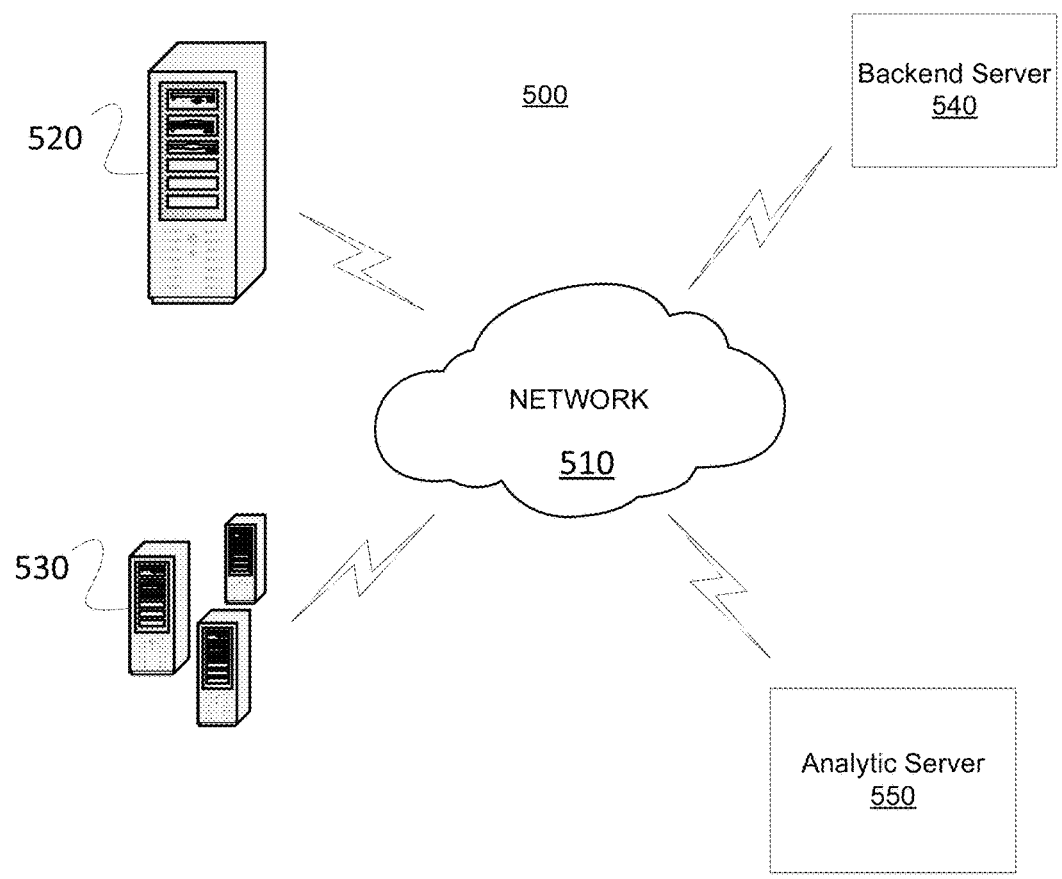
FIG. 5 is a block diagram illustrating an enterprise network, in accordance with an embodiment of the present invention.

Referring now to FIG. 5, an exemplary enterprise network 500 is shown which may represent the network in a single business location or across a business at many locations, in accordance with an embodiment of the present invention. The enterprise network 500 may include a node 520 or a plurality of nodes 530 that communicate through a network 510. In one embodiment, the node 520 or plurality of nodes 530 may be an employee's work computer. In another embodiments, the node 520 or the plurality of nodes 530 may be servers, validation machines, or any combination of similar technology. In one embodiment, the network 510 may be a local area network. In another embodiments, the network 510 may be the internet, a virtual private network, or any combination of similar technologies. The network 510 may also communicate with a backend server 540. The backend server 540 may receive information from the node 520 or the plurality of nodes 530 through the network 510. The backend server 540 may pre-process the information from the node 520 or the plurality of nodes 530. The backend server 540 may send the pre-processed information to an analytic server 550 for further processing. The analytic server 550 may process the pre-processed information to detect anomalies on the enterprise network 500.

Referring to FIG. 6, a flow chart for a network anomaly detection method 600 is illustratively shown, in accordance with an embodiment of the present invention. In block 610, receive a plurality of events from network devices, the plurality of events including entities that are involved in the plurality of events. In block 620, embed the entities into a common latent space based on co-occurrence of the entities in the plurality of events. In block 630, model respective pairs of the entities for compatibility according to the embedding of the entities to form a pairwise interaction for the respective pairs of the entities. In block 640, weigh the pairwise interaction of different ones of the respective pairs of the entities based on one or more compatibility criterion to generate a probability of an occurrence of an anomaly. In block 650, alter the configuration of one or more of the network devices based on the probability of the occurrence of the anomaly.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for anomaly detection in a network having network devices including computers, the method comprising:
   receiving a plurality of events from the network devices, the plurality of events including entities that are involved in the plurality of events;
   embedding the entities into a common latent space based on co-occurrence of the entities in the plurality of events;
   modeling respective pairs of the entities for compatibility according to the embedding of the entities to form a pairwise interaction for the respective pairs of the entities employing a context-dependent noise distribution with a negative entity sampling;
   weighing the pairwise interaction of different ones of the respective pairs of the entities based on one or more compatibility criterion to generate a probability of an occurrence of an anomaly; and
   altering the configuration of one or more of the network devices based on the probability of the occurrence of the anomaly.

2. The method as recited in claim 1, wherein the altering the configuration of one or more of the network devices includes removing the one or more of the network devices from the network based on the probability of the occurrence of the anomaly.

3. The method as recited in claim 1, wherein the altering the configuration of one or more of the network devices includes alerting a network system administrator of a network intrusion based on the probability of the occurrence of the anomaly.

4. The method as recited in claim 1, wherein the modeling respective pairs of the entities for compatibility includes assigning each of the entities a d-dimensional vector.

5. The method as recited in claim 4, wherein the modeling respective pairs of the entities for compatibility includes measuring a distance between the entities based on the d-dimensional vector when forming the pairwise interaction.

6. The method as recited in claim 1, wherein the modeling respective pairs of the entities includes generating a noise-contrastive estimation for context-dependent noise distribution.

7. The method as recited in claim 6, wherein the noise-contrastive estimation employs a normalization constant as a parameter.

8. The method as recited in claim 1, wherein the probability of an occurrence of an anomaly is generated by counting unigrams of the entities.

9. The method as recited in claim 1, wherein the modeling respective pairs of the entities includes utilizing a context-dependent noise distribution with a negative sampling that depends on one of the plurality of events.

10. The method as recited in claim 1, wherein the probability of the occurrence of the anomaly is generated in a binary for selected from the group consisting of a probability that one of the plurality of events is normal or a probability that one of the plurality of events is abnormal.

11. A non-transitory article of manufacture tangibly embodying a computer readable program which when executed causes a computer to perform the steps of claim 1.

12. A system for performing anomaly detection in a network, the system comprising:
   a server having a processor configured to:
      receive a plurality of events from network devices, the plurality of events including entities that are involved in the plurality of events;

embed the entities into a common latent space based on co-occurrence of the entities in the plurality of events;

model respective pairs of the entities for compatibility according to the embedding of the entities to form a pairwise interaction for the respective pairs of the entities employing a context-dependent noise distribution with a negative entity sampling;

weigh the pairwise interaction of different ones of the respective pairs of the entities based on one or more compatibility criterion to generate a probability of an occurrence of an anomaly; and alter the configuration of one or more of the network devices based on the probability of the occurrence of the anomaly.

13. The system as recited in claim 12, wherein the altering the configuration of one or more of the network devices includes isolating the one or more of the network devices based on the probability of the occurrence of the anomaly.

14. The system as recited in claim 12, wherein the altering the configuration of one or more of the network devices includes alerting a network system administrator of a network intrusion based on the probability of the occurrence of the anomaly.

15. The system as recited in claim 12, wherein the modeling respective pairs of the entities for compatibility includes assigning each of the entities a d-dimensional vector.

16. The system as recited in claim 15, wherein the modeling respective pairs of the entities for compatibility includes measuring a distance between the entities based on the d-dimensional vector when forming the pairwise interaction.

17. The system as recited in claim 12, wherein the modeling respective pairs of the entities includes generating a noise-contrastive estimation for context-dependent noise distribution.

18. The system as recited in claim 17, wherein the noise-contrastive estimation employs a normalization constant as a parameter.

19. The system as recited in claim 12, wherein the probability of an occurrence of an anomaly is generated by counting unigrams of the entities.

20. The system as recited in claim 12, wherein the modeling respective pairs of the entities includes utilizing a context-dependent noise distribution with a negative sampling that depends on one of the plurality of events, wherein the negative sampling is formed by altering one of the entities involved in the one of the plurality of events.

* * * * *